United States Patent
Stytsenko et al.

(10) Patent No.: US 8,331,197 B2
(45) Date of Patent: Dec. 11, 2012

(54) BEAM FORMING SYSTEM AND METHOD

(75) Inventors: Eugene Stytsenko, Wellington (NZ); Neil Scott, Wellington (NZ); Mark Poletti, Wellington (NZ)

(73) Assignee: Industrial Research Limited, Wellington (NZ)

( * ) Notice: Subject to any disclaimer, the term of this patent is extended or adjusted under 35 U.S.C. 154(b) by 306 days.

(21) Appl. No.: 12/672,217

(22) PCT Filed: Aug. 7, 2008

(86) PCT No.: PCT/NZ2008/000198
§ 371 (c)(1), (2), (4) Date: Apr. 20, 2010

(87) PCT Pub. No.: WO2009/020404
PCT Pub. Date: Feb. 12, 2009

(65) Prior Publication Data
US 2011/0205848 A1    Aug. 25, 2011

(30) Foreign Application Priority Data
Aug. 7, 2007    (NZ) ........................ 560452

(51) Int. Cl.
*H04B 1/02* (2006.01)
*G21K 1/00* (2006.01)
(52) U.S. Cl. .................................. 367/138
(58) Field of Classification Search .............. 367/138; 250/505.1
See application file for complete search history.

(56) References Cited

U.S. PATENT DOCUMENTS

| | | |
|---|---|---|
| 3,775,769 A | 11/1973 | Heeren et al. |
| 4,332,018 A | 5/1982 | Sternberg et al. |
| 4,413,332 A | 11/1983 | Gilmour |
| 4,591,864 A | 5/1986 | Sternberg et al. |
| 4,847,628 A | 7/1989 | Sternberg |
| 5,122,993 A | 6/1992 | Hikita et al. |
| 5,526,325 A | 6/1996 | Sullivan et al. |
| 5,546,356 A | 8/1996 | Zehner |
| 6,046,857 A | 4/2000 | Morishima |
| 6,483,474 B1 | 11/2002 | Desargant et al. |
| 6,961,025 B1 | 11/2005 | Chethik et al. |
| 2005/0185306 A1 | 8/2005 | Bavdaz et al. |

FOREIGN PATENT DOCUMENTS
EP    0 019 548 A    11/1980
WO   WO 2009020404 A1 *  2/2009

OTHER PUBLICATIONS

Luh, H.H.S., "Equivalent hyperboloid (ellipsoid) and its application", *Antennas and Propagation, IEEE Transactions*, vol. 48, Issue 4, Apr. 2000, pp. 581-584, Abstract Only—One Page.

Luh, H.H.S., "Equivalent hyperboloid (ellipsoid) and its application", *Antennas and Propagation, IEEE Transactions*, vol. 48, Issue 4, Apr. 2000, pp. 581-584, Full Article.

* cited by examiner

*Primary Examiner* — Daniel Pihulic
(74) *Attorney, Agent, or Firm* — Frommer Lawrence & Haug LLP; Ronald R Santucci

(57) ABSTRACT

A beam forming system includes one or more beam forming elements that are arranged to provide a non-planar doubly ruled radiation surface. The surface is defined by two families of rulings such that the length of the rulings within each family are configured to provide a radiation surface with substantially straight boundary edges, and the beam forming system is arranged to form acoustic beams.

24 Claims, 10 Drawing Sheets

BEAM FORMING SYSTEM AND METHOD

This application is a 371 of PCT/NZ2008/000198 filed on Aug. 7, 2008, published on Feb. 12, 2009 under publication number WO 2009/020404 A and claims priority benefits of New Zealand Patent Application No. 560452 filed Aug. 7, 2007 the disclosure of which is hereby incorporated by reference.

FIELD OF THE INVENTION

The present invention relates to a system and method for producing acoustic or electromagnetic beams. In particular, although not exclusively, the invention relates to a system and method for producing acoustic or electromagnetic beams with sharp angular cut-offs.

BACKGROUND TO THE INVENTION

Acoustic beams are used in many applications including sonar and other underwater acoustic devices, audio transducers, and acoustic control of space, for example architectural acoustics. Electromagnetic beams are typically used for radar broadcast and reception.

In sonar and underwater acoustic devices the objective can be to map the ocean floor or to detect objects within the water that may be moving or at rest. In these applications it is important that the signal sent out by the underwater acoustic device minimises reflections from directions other than that targeted by the device.

Additional uses for underwater acoustic devices include fish finding and fish population estimation, inspection of underwater objects such as boat hulls, piers, and navigation.

Radar systems are well known. These systems use electromagnetic beams for detection and identification of both stationary and moving objects. Typical radar devices use electromagnetic waves in the microwave frequency range. Radar systems are used for the detection and control of aircraft, guiding of ships in fog, military application, and for locating distant storm systems.

It is an object of the present invention to provide an improved beam forming system and method for producing acoustic or electromagnetic beams with sharp angular cut-offs, or to at least provide the public with a useful choice.

SUMMARY OF THE INVENTION

In a first aspect, the present invention broadly consists in a beam forming system comprising one or more beam forming elements that are arranged to provide a non-planar doubly ruled radiation surface.

In one form, the radiation surface may be a hyperbolic paraboloid. In another form, the radiation surface may be a hyperboloid of one sheet.

In one form, the beam forming elements may comprise an array of straight elongate beam forming elements that are arranged relative to each other to collectively provide a substantially doubly ruled radiation surface. By way of example, each straight elongate beam forming element may comprise a plurality of beam forming elements that act together to from the straight elongate beam forming element.

In one form, the straight elongate beam forming elements may be fixed relative to each other within a support structure so as to provide a predetermined beam-width of beams propagating from the radiation surface. In another form, the straight elongate beam forming elements may be movably supported relative to each other within a frame system, the frame system being operable to rotate the straight elongate beam forming elements relative to each other to alter angular parameters of the doubly ruled radiation surface so as to vary the beamwidth of beams propagating from the radiation surface.

In another form, a single beam forming element may provide the doubly ruled radiation surface. By way of example, the single beam forming element may comprise a continuous sheet of beam forming material that conforms to a doubly ruled surface.

In one form, the beam forming system may be arranged to form acoustic beams.

In one form, the beam forming system may be arranged as an acoustic transducer for projecting and/or receiving acoustic beams from the radiation surface.

Preferably, the or each beam forming element is an acoustic transducer element comprising an active acoustic material that is operatively driven by front and back electrodes provided on opposing surfaces of the active acoustic material. More preferably, the beam forming system may further comprise a control system that is operatively connected to the electrodes and is arranged to drive the electrodes with electrical signals to cause the acoustic transducer to project and/or receive acoustic beams.

Preferably, the control system may be configured in an active mode to drive the acoustic transducer element(s) with electrical signals having uniform phase to produce an acoustic beam from each acoustic transducer element such that the overall acoustic beam projected from the radiation surface is the superposition of all of the acoustic beams from each acoustic transducer element.

In one form, the front and back electrodes may be aligned with one family of rulings of the doubly ruled radiation surface. In another form, the front electrodes of the acoustic transducer element(s) may be aligned with one family of rulings of the doubly ruled radiation surface and the back electrodes may be aligned with the other family of rulings of the doubly ruled radiation surface to provide a matrix electrode network. Preferably, a control system may be operatively connected to all the electrodes in the matrix electrode network, and is operable to selectively drive different combinations of electrodes with electrical signals to thereby drive different combinations of selected acoustic transducer elements to produce any of the following: a wide-angle acoustic beam, acoustic beam-stripe, or an acoustic spot-beam.

In another form, each beam forming element may comprise passive acoustic material such that the beam forming system can operate as an acoustic reflector or acoustic diffuser of acoustic beams incident on its radiation surface. Preferably, the passive acoustic material of the beam forming element(s) may be acoustically reflective.

In another form, the beam forming system may be arranged to form electromagnetic beams. Preferably, the beam forming system may be arranged to project or reflect electromagnetic beams.

In a second aspect, the present invention broadly consists in an active beam forming device comprising a plurality of straight elongate beam forming elements arranged as a hyperboloid of one sheet.

In a third aspect, the present invention broadly consists in an active beam forming device comprising a plurality of straight elongate beam forming elements arranged as a hyperbolic paraboloid.

Preferably, the beam forming elements may be formed from piezoelectric material. In alternative embodiments the beam forming elements may be formed from magnetostrictive material or any other active beam forming material.

Preferably, the straight elongate beam forming elements may be line sources. Alternatively, the straight elongate beam forming elements may be differently shaped transducer elements acting together as straight elongate beam forming elements.

Preferably, the active beam forming device may further comprise electrical connections to a control system.

In one form, the straight elongate beam forming elements may include amplitude weighting. Any suitable form of amplitude weighting may be used.

The beam forming elements may produce acoustic beams or electromagnetic beams.

In preferred forms, the maximum distance between the straight elongate beam forming elements is less than or equal to half a wavelength of the maximum operating frequency.

In a fourth aspect, the present invention broadly consists in an active acoustic device comprising an acoustically active material arranged as a hyperboloid of one sheet.

In a fifth aspect, the present invention broadly consists in an active acoustic device comprising an acoustically active material arranged as a hyperbolic paraboloid.

In a sixth aspect, the present invention broadly consists in an acoustic reflector comprising a plurality of straight elongate active or passive acoustic elements of reflective material arranged as a hyperboloid of one sheet.

In a seventh aspect, the present invention broadly consists in an acoustic reflector comprising a plurality of straight elongate active or passive acoustic elements of reflective material arranged as a hyperbolic paraboloid.

In a eighth aspect, the present invention broadly consists in an acoustic diffuser comprising a plurality of straight elongate active or passive acoustic elements of reflective material arranged as a hyperboloid of one sheet.

In a ninth aspect, the present invention broadly consists in an acoustic diffuser comprising a plurality of straight elongate active or passive acoustic elements of reflective material arranged as a hyperbolic paraboloid.

In a tenth aspect, the present invention broadly consists in a method of producing an acoustic beam comprising driving an active acoustic device comprising a plurality of straight elongate acoustic elements arranged as a hyperbolic paraboloid with a uniform phase.

In an eleventh aspect, the present invention broadly consists in a method of producing an acoustic beam comprising driving an active acoustic device comprising a plurality of straight elongate acoustic elements arranged as a hyperboloid of one sheet with a uniform phase.

The phrase "radiation surface" as used in this specification and claims is intended to mean the surface of the beam forming system from or through which acoustic or electromagnetic beams are projected, received, reflected or diffused, and may be provided by an integral surface of active or passive beam forming material, or may be the collective surface formed by a plurality of active or passive beam forming elements, or any other such radiation surface formation.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the following drawings, in which.

DETAILED DESCRIPTION OF PREFERRED EMBODIMENTS

Overview

Figure 1:
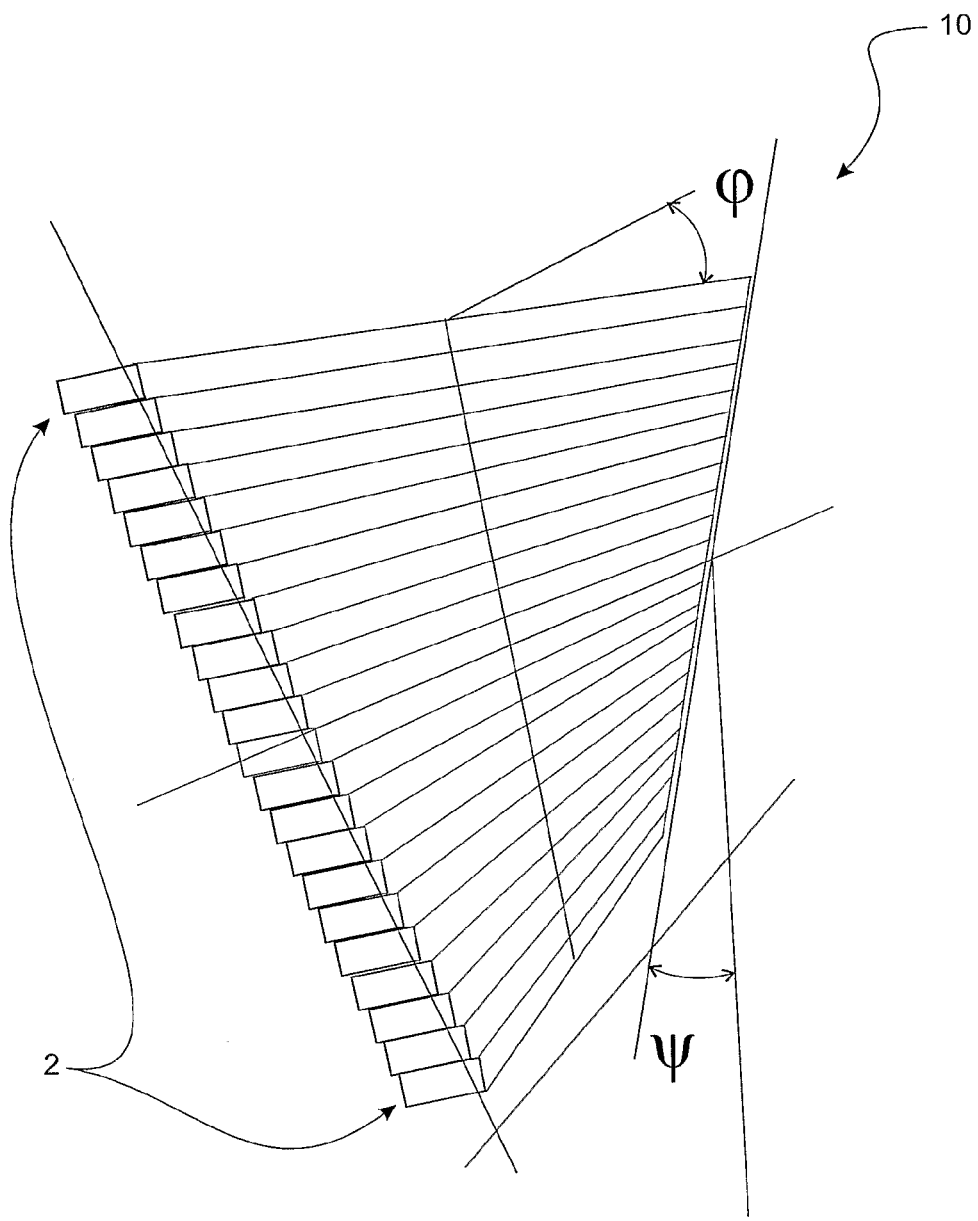
FIG. 1 is a schematic diagram of a first preferred embodiment of the invention in the form of an acoustic beam forming system having a hyperbolic paraboloidal radiation surface.

The present invention relates to a beam forming system and method for producing acoustic or electromagnetic beams of constant or variable beam-width, and with sharp angular cut-offs. The beam forming system can be adapted and configured for the projection, reception, reflection and/or diffusion of beams, including acoustic and electromagnetic beams, at any suitable frequency, including, by way of example only, acoustic, ultrasonic, and microwave frequencies.

The beam forming system can be employed in various acoustic devices for various applications, including, by way of example only, sonar and other underwater acoustic devices, audio transducers, architectural acoustic systems and the like. Likewise, the beam forming system can be employed in various applications that require the projection, reception, reflection and/or diffusion of electromagnetic beams, such as radar and the like.

The beam forming system can comprise active or passive beam forming elements, and can be operated in active or passive modes depending on the operation. For example, the beam forming system may be embodied as an acoustic transducer comprising active beam forming elements that may be driven in an active mode to project an acoustic beam from the transducer or alternatively a passive mode for receiving and processing an acoustic beam incident on the transducer. Additionally, the beam forming system may be embodied as passive acoustic reflectors or acoustic diffusers comprising passive beam forming elements. Active and passive modes and components can also similarly be employed for electromagnetic beam applications.

The beam forming system employs a doubly ruled radiation surface to form the desired acoustic or electromagnetic beams having sharp angular cut-offs. The doubly ruled radiation surfaces may be in the form of either a hyperbolic paraboloid or a hyperboloid of one sheet (herein: hyperboloidal). It will be appreciated that a surface is doubly ruled if through every one of its surface points there are two distinct straight lines that lie on its surface, and such doubly ruled surfaces can be formed with a plurality of straight elements.

Further, doubly ruled surfaces can be described as having two families of rulings. Depending on the application of the beam forming system, the doubly ruled radiation surface can be manipulated or configured in terms of its angular and dimensional parameters to produce or form a beam having the desired far-field beam-width and angular cut-off characteristics.

For example, the beam forming system can be configured to projecting beams having a wide-angle in the far field with reference to either or both the horizontal and vertical directions perpendicular to the beam propagation direction. Further, the far-field beam-width may be controlled in both the horizontal and vertical directions, and depending on the application can be wide in both, wide in one direction and narrow in the other, or narrow in both directions. In the preferred form, the beam forming system is arranged to produce beams having sharp angular cut-offs in the far-field preferably relative to both the horizontal and vertical directions, but at least with respect to one direction, such as the wide angle direction for example.

Various embodiments of the beam forming system employed in acoustic applications will now be described by way of example only.

Hyperbolic Paraboloidal Acoustic Beam Forming System

Referring to FIG. 1, a first preferred embodiment of the beam forming system is in the form of an acoustic array transducer 10 for projecting acoustic beams in an active mode and/or receiving acoustic beams in a passive mode. The acoustic transducer 10 could be employed in monostatic or bistatic applications. The acoustic transducer 10 is formed from one or more active acoustic beam forming elements 2 that are arranged into a hyperbolic paraboloid configuration so as to provide a hyperbolic paraboloidal radiation surface for projecting and/or receiving acoustic beams.

In the first preferred embodiment, the active beam forming elements 2 are straight elongate acoustic transducer elements that are fixed together or otherwise supported in the hyperbolic paraboloidal arrangement shown by support structures, support materials or fixing techniques known to those skilled in the art of array transducers. For example, it will be appreciated that the support structures may optionally include acoustic insulation between each of the transducer elements 2.

The hyperbolic paraboloid can conceptually be thought of as being created by deforming a plane from the x, y plane by angles $\psi$ and $\phi$. The acoustic transducer 10 produces a beam of $2\psi \times 2\phi$ in an active mode. As angles $\psi$ and $\phi$ change, so does the width of the acoustic beam relative to the horizontal and vertical directions perpendicular to the beam propagating direction. In FIG. 1, angle $\psi$ gives the vertical beam-width angle and angle $\phi$ gives the horizontal beam-width angle.

Figure 2:
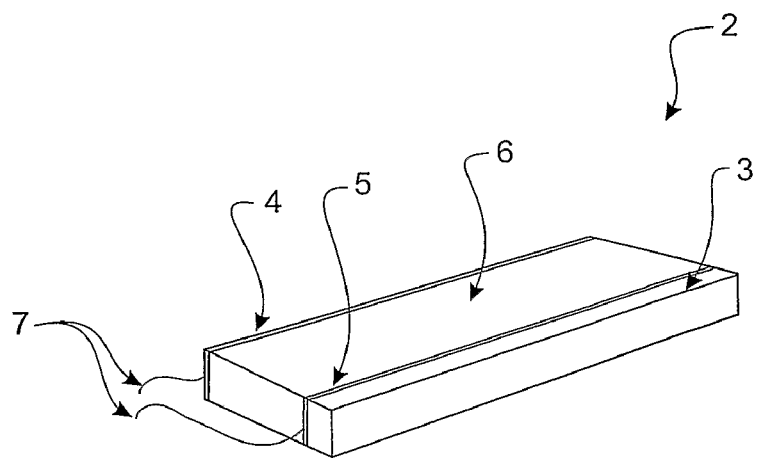
FIG. 2 is a schematic diagram of a straight elongate acoustic transducer element that may be used to form part of the acoustic beam forming system of FIG. 1.

FIG. 2 shows one possible embodiment of straight elongate acoustic transducer element 2 that may be used to form the acoustic transducer 10 of FIG. 1. In the preferred embodiment, each transducer element 2 is a piezoelectric line source comprising a matching layer 3, and front 4 and back 5 electrodes that sandwich a piezoelectric ceramic plate 6. The transducer elements may also preferably include wires 7 coupled to the electrodes 4,5 for connection to a control system. The control system comprises electronic driving circuits that provide electrical driving signals for the electrodes of each transducer element 2 to produce the acoustic beams in the active mode and/or electronic processing circuits for receiving electrical signals from the electrodes of each transducer element 2 that are generated in response to a received acoustic beam in the passive mode.

Figure 3:
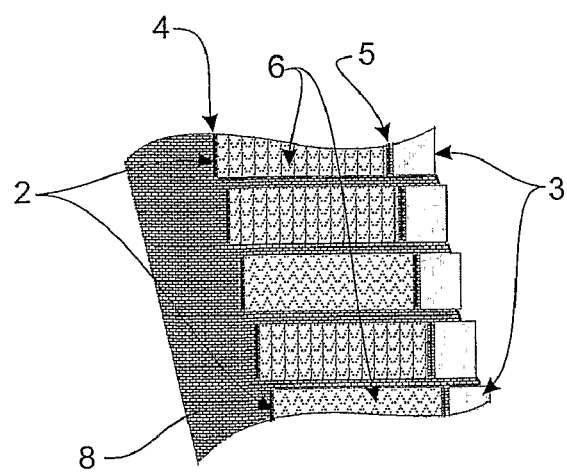
FIG. 3 is a side view of a plurality of straight elongate transducer acoustic elements of FIG. 2 formed into part of the acoustic beam forming system of FIG. 1.

FIG. 3 is a cross-sectional view of the assembly of transducer elements 2 of the acoustic transducer 10 in more detail. FIG. 3 shows a plurality of transducer elements 2, each having a piezoelectric ceramic plate 6, matching layer 3 disposed toward the radiation surface, and front and back electrodes 4,5. In the first preferred embodiment, acoustic insulation 8 is provided around and between the transducer elements 2 as a support structure/material for fixing the transducer elements in place relative to each other, but it will be appreciated that any other suitable technique for constructing the array of transducer elements could be utilised. In the first preferred embodiment, the maximum distance between each transducer element or line source 2 should not exceed half a wavelength of the maximum frequency of operation of acoustic transducer 10. For example, if the maximum frequency of operation is 3 kHz in air (velocity 330 m/s), the maximum distance between the line sources 2 should be 5.5 cm.

In operation, the control system of the acoustic transducer 10 is preferably configured to drive each of the active transducer elements 2 with a uniform phase in the active mode to generate and project an acoustic beam. When driven, each transducer element 2 produces an acoustic beam and the overall acoustic beam of the acoustic transducer 10 is the superposition of all the beams from each transducer element 2. More particularly, the beams produced by each active transducer element 2 are superimposed on each other to form the final beam, which is shown in FIG. 4B.

Amplitude weighting can also be applied to the transducer elements 2 by the control system or any other suitable means, for example according to known window functions such as Hamming windows or otherwise derived.

If the average length of the transducer elements 2 is greater than several wavelengths of the operating frequency, the width of the beam produced by the acoustic transducer 10 is substantially defined by the maximum angular deviation of the hyperbolic paraboloid from the x, y plane.

If the acoustic transducer 10 is driven at a single frequency the resultant acoustic beam projected has angular cut-offs that are dependent on the effective length of the transducer elements 2. The width of the beam and sharpness of the cut-offs are independent and can be controlled independently by adjusting the angular deviation of the hyperbolic paraboloid from the x, y plane and by adjusting the effective length of the transducer elements 2 respectively.

Figure 4A:
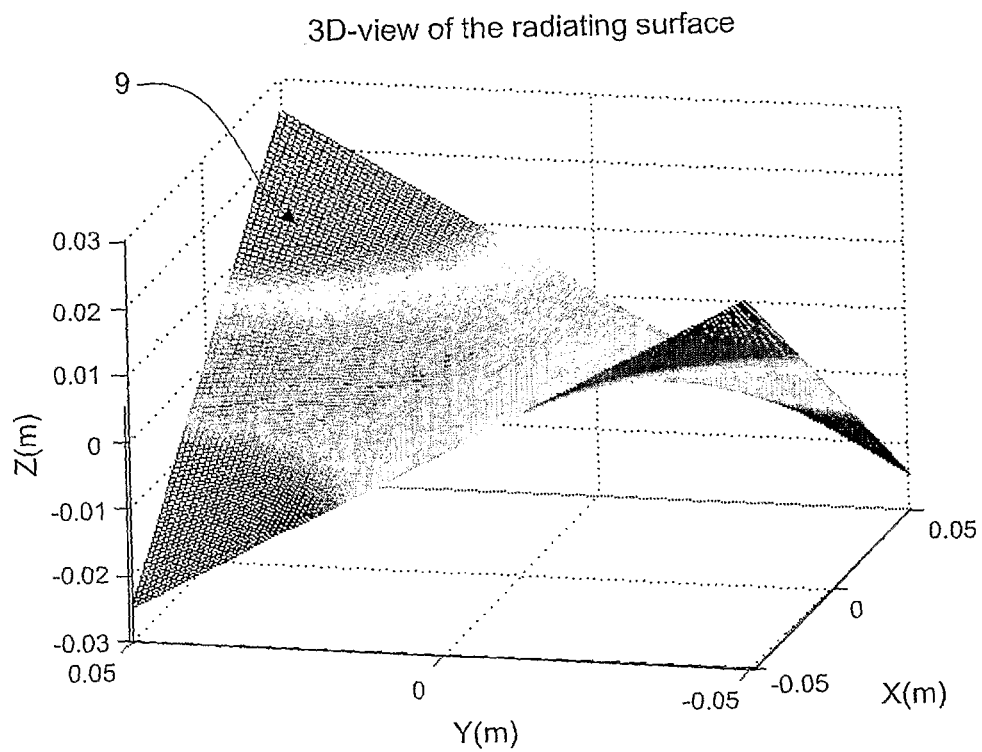
FIG. 4A is a three-dimensional view of the effective hyperbolic paraboloidal radiation surface of the acoustic beam forming system of FIG. 1.
Figure 4B:
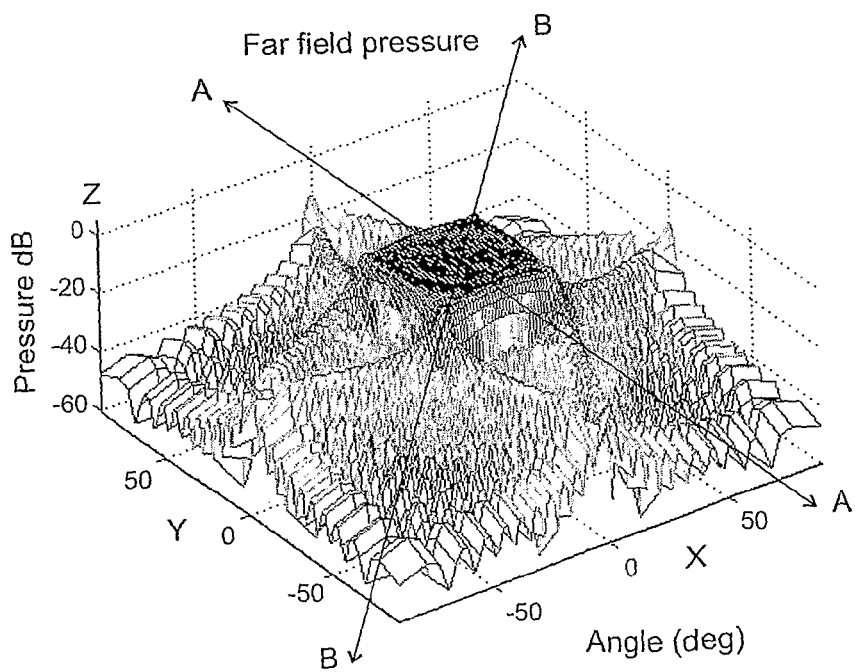
FIG. 4B is a three-dimensional view of a far-field beam pattern produced by the hyperbolic paraboloidal radiation surface of FIG. 4A.

FIG. 4A shows a three-dimensional view of the effective hyperbolic paraboloidal radiation surface 9 of the acoustic transducer 10 of FIG. 1. The dotted lines shown in FIG. 4A are grid lines and are not representative of any active or passive acoustic elements 2. As shown, the array or assembly of the transducer elements 2 collectively provides a hyperbolic paraboloidal radiation surface 9.

FIG. 4B shows a three-dimensional view of a far field beam(pressure) pattern formed by the acoustic transducer 10 having the hyperbolic paraboloidal radiation surface 9 of FIG. 4A. As can be seen in FIG. 4B, the beam pattern has a substantially rectangular face with sharp roll-offs.

Figure 4C:
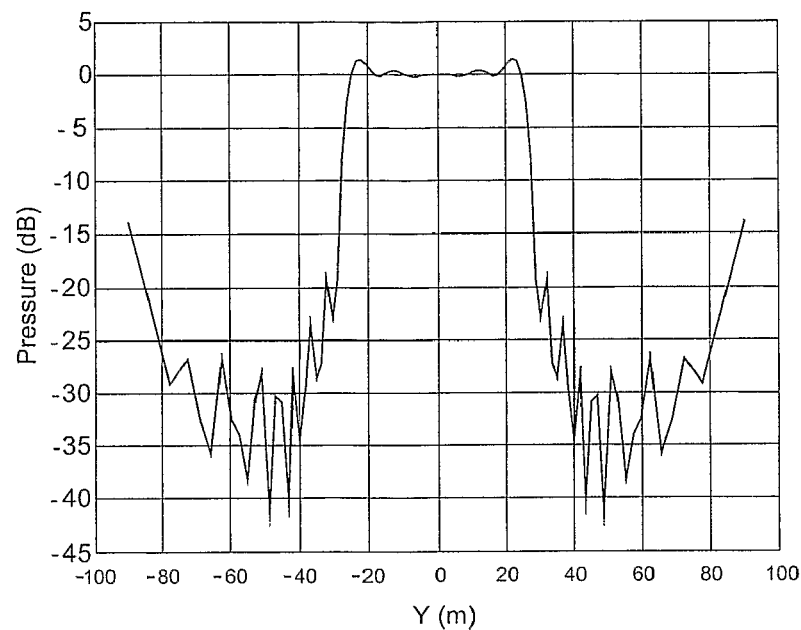
FIG. 4C is a cross-sectional view of the beam pattern of FIG. 4B along the line AA, which is parallel to the y-axis.
Figure 4D:
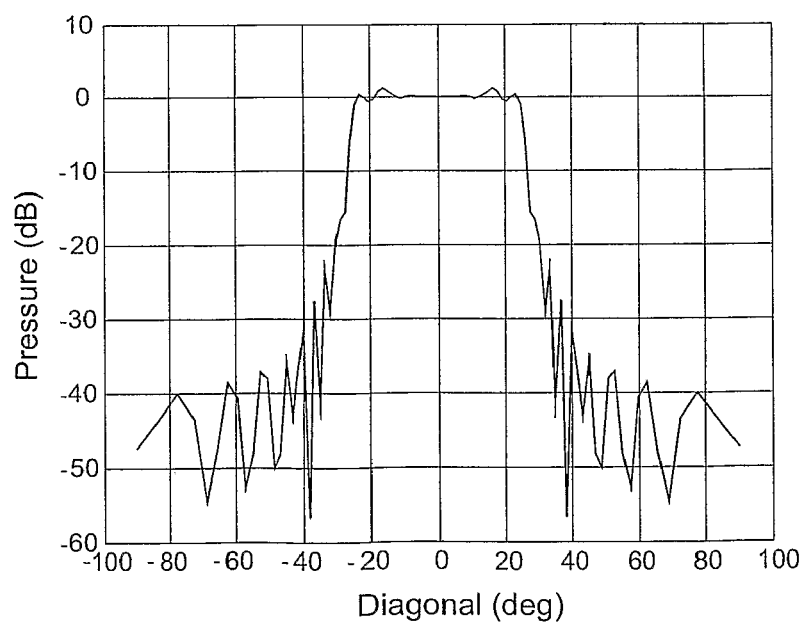
FIG. 4D is a cross-sectional view of the beam pattern of FIG. 4B along line BB, which is a diagonal between the x and y-axis directions.

FIGS. 4C and 4D show cross-sectional views of the beam pattern of FIG. 4B in the vertical planes along line AA parallel to the y-axis (FIG. 4C) and along the line BB, which is on a diagonal between the x and y axes (FIG. 4D). The beam pattern of FIG. 4B was formed by an active acoustic transducer 10 in which the angles of deformation of the hyperbolic paraboloid of FIG. 4A are about 15 degrees in each of the x and y directions. These angles can be calculated from the transducer itself or the horizontal and vertical beam-widths of the beam formed by the transducer using the equation given previously.

FIG. 2 shows one possible embodiment of the acoustic transducer elements 2 that can be used to form the hyperbolic paraboloidal array of the acoustic transducer 10. However, it will be appreciated that straight elongate transducer elements need not necessarily be used as the line sources. For example, it will be appreciated that each line source 2 could be formed from multiple transducer elements or blocks of other shapes that act together to form a straight line source and have the equivalent effect. It will also be appreciated that the transducer elements 2 need not necessarily be piezoelectric and may alternatively be magnetostrictive elements, or any other type of other lines source transducer or active acoustic material may be used.

In alternative embodiments, the acoustic transducer need not necessarily comprise an array of transducer elements. For example, the beam forming system could alternatively be formed from one continuous sheet or integral piece or of acoustically active material that is molded or formed into the hyperbolic paraboloidal shape to thereby provide an acoustic transducer surface. In such an embodiment, the acoustically active material may be, for example, any suitable piezoelectric or electret polymer material, including PVDF (Polyvinylidene Fluoride). Ceramic-polymer composites could also be utilised.

The foregoing has described a beam forming system in the form of an active acoustic transducer 10 having a hyperbolic paraboloidal configuration. It will be appreciated that the hyperbolic paraboloidal beam forming system can also be employed in passive applications, such as acoustic reflectors and acoustic diffusers. In such passive embodiments, the beam forming system employs passive acoustic elements or material to form the hyperbolic paraboloidal arrangement and radiation surface.

When the hyperbolic paraboloidal beam forming system is used as an acoustic reflector, the radiation surface is arranged to reflect a plane incident acoustic wave. The cut-offs of the acoustic beam produced by reflection of the plane incident wave from the acoustic reflector will be dependent on the effective length of the passive elements. The beam-width of the reflected acoustic beam will depend on the rotation of the passive elements or, more particularly, their degree of angular deviation from the x, y plane to form the hyperbolic paraboloid. The two-way propagation from reflection results in an additional phase shift proportional to the radiation surface deviation from the x, y plane. This means that the beam formed by the reflection of a plane incident wave propagating along the acoustic axis of the acoustic reflector is two times wider than a beam produced by the projector, for example the acoustic transducer 10, of the same structure. For example, if the beam forming system of FIG. 1 was configured in a passive mode as an acoustic reflector, the beam-width of the reflected acoustic beam would be 4 $\psi \times 4\ \phi$.

In the passive mode, such as when acting as an acoustic reflector, the elements of the beam forming system are formed from acoustically reflective material as the acoustic passive mode requires substantial reflection from the elements. This reflection is achieved when the specific acoustic impedance of the reflector elements is significantly different from that of the acoustic medium.

As mentioned, the hyperbolic paraboloidal beam forming system can also be used in other passive applications, such as an acoustic diffuser. When configured as an acoustic diffuser, the hyperbolic paraboloidal radiation surface acts to convert an incoming plane wavefront into a wider-angle beam, but still maintains sharp angular cut-offs.

The hyperbolic paraboloidal beam forming system and method described above has been described for acoustic applications. It will be appreciated that the same system and method can be used for forming electromagnetic beams. For example, the acoustically reflective material of the passive acoustic beam forming system can be replaced with electromagnetically reflective material as will be obvious to those skilled in the art. The electromagnetic beam forming system could be used in radar applications for example.

As mentioned, the beam forming system can be arranged to produce constant or variable beam-width acoustic beams with sharp angular cut-offs. The first preferred embodiment acoustic transducer 10 was a constant beam-width beam forming system in that the line sources 2 were fixed relative to one another by a support structure or material thereby providing fixed angular deformations of the x, y plane so as to set the beam-width. In alternative embodiments, as will now be described with reference to FIGS. 5A and 5B, a variable beam-width beam forming system can be provided.

Figure 5A:
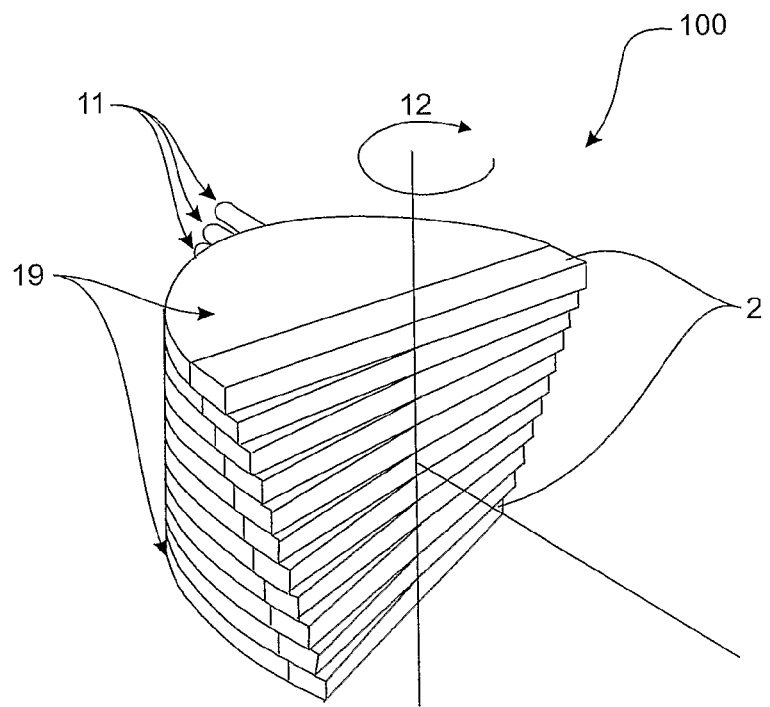
FIG. 5A is a schematic diagram of a second preferred embodiment of the invention in the form of an acoustic beam forming system of the type shown in FIG. 1 but with a mechanically controllable beam-width.
Figure 5B:
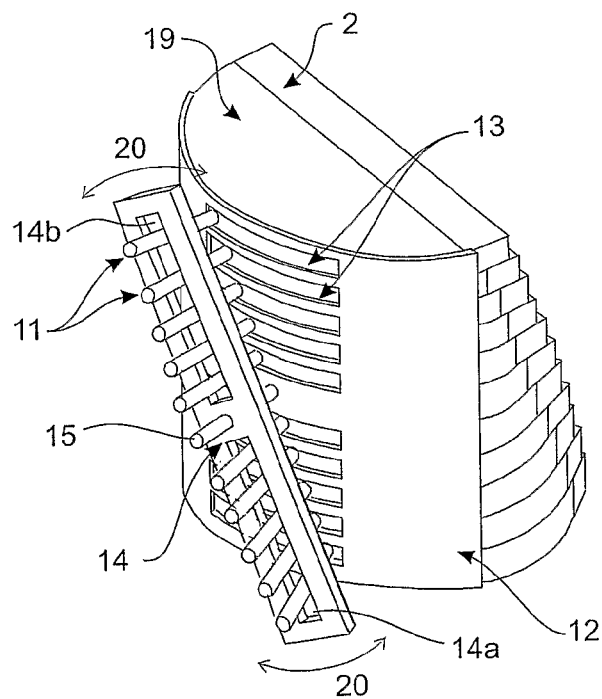
FIG. 5B shows the beam-width controller of the second preferred embodiment acoustic beam forming system of FIG. 5A.

Referring to FIGS. 5A and 5B, a second preferred embodiment of the acoustic transducer 100 is provided with a mechanically controllable beam-width. In particular, the angular parameters of the hyperbolic paraboloidal radiation surface can be altered or varied mechanically so as to enable the beam-width of transducer to be altered to suit different applications or uses. In particular, the transducer elements 2 of the acoustic transducer 100 are moveable relative to each other to control the angular parameters of the doubly ruled surface and thereby the beam-width of the acoustic beam generated.

In the second preferred embodiment, the acoustic transducer 100 is again provided with an array of acoustic transducer elements 2, such as piezoelectric line sources or the like. The matching layers and electrodes of the transducer elements 2 are not shown for clarity. Each line source 2 includes a semi-circular support plate 19. Each support plate 19 includes a pin 11 that extends from the support plate 19 on the opposite side of the support plate to the line source. The line sources 2 and their respective support plates 19 are stacked in a semi-cylindrical guide frame 12 that is positioned at least partially around the semi-circular portion of the support plates 19. The guide frame 12 includes a plurality of slots 13 corresponding to each line source 2 and through which the respective pins 11 of the support plates 19 extend. The support plate 19 at the centre of the stack may be connected or fixed to the guide frame 12. A moveable substantially rectangular pin frame 14 is positioned around pins 11. In the second preferred embodiment, the pin frame 14 has two slots 14a,14b through which lower and upper pins 11 extend respectively, with and a central hole being provided between the slots 14a,14b for the pin 15 of the centre support plate of the stack. In an alternative embodiment, the pin frame 14 can be integral with frame 12 so as to fix the beam-width to a preset constant width.

In operation of the variable beam-width acoustic transducer 100, the pin frame 14 can be mechanically rotated about the centre pin 15 to change the angle of the pins 11 from the vertical as shown by arrows 20. When the pins 11 are in a vertical line the face or radiation surface of the acoustic transducer is a plane. As the pins 11 are moved from the vertical line by virtue of rotation of the pin frame 14, the support plates 9 rotate and the face of the acoustic transducer 100 becomes a hyperbolic paraboloid. Therefore, movement of the pins 11 from the vertical line controls the beam-width of the acoustic beam projected from the acoustic transducer 100. As shown in FIG. 5A, movement of the pins 11 causes rotation of the line sources 2 about rotation axis 12 orthogonal to the axis of the propagating acoustic beam. The greater the rotation of the line sources 2 about rotation axis 12, the greater the beam-width of the acoustic beam. It will be appreciated that the movement of the pin frame 14 relative to the guide frame 12 can be achieved mechanically or otherwise controlled. Further, it will be appreciated that other framing systems could be utilised to allow the angular parameters of the hyperbolic paraboloidal radiation surface to be varied as desired in order to customise the beam-width characteristics of the acoustic beam generated. For example, it will be appreciated that other mechanical or electro-mechanical system could also be used to provide movement or rotation of the line sources 2 relative to each other in a hyperbolic paraboloidal arrangement.

Hyperboloid of One Sheet (Hyperboloidal) Acoustic Beam Forming System

Figure 6:
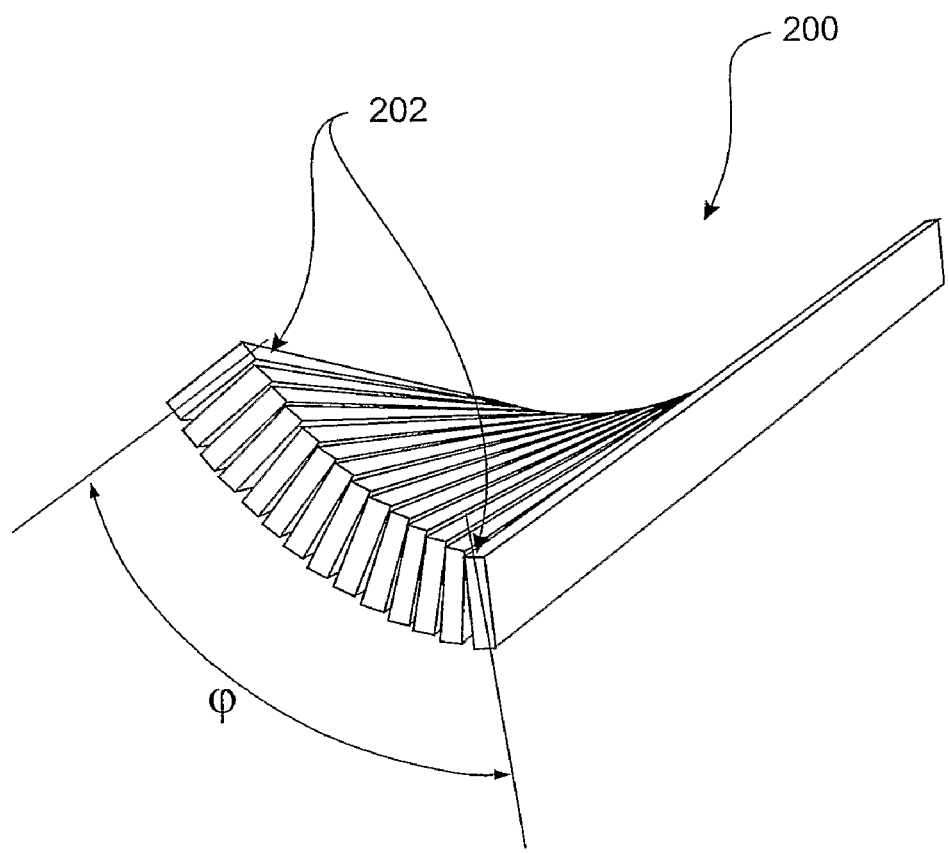
FIG. 6 is a schematic diagram of a third preferred embodiment of the invention in the form of an acoustic beam forming system having a radiation surface conforming to a hyperboloid of one sheet.

Referring to FIG. 6, a third preferred embodiment of the beam forming system is in the form of an acoustic array transducer 200 comprising one or more active acoustic beam forming elements 202 that are arranged to provide a radiation surface in the form of a hyperboloid of one sheet. The principles, materials and alternatives of construction, methods of operation, and varying active and passive applications and forms of the first preferred embodiment hyperbolic paraboloidal acoustic transducer 10 apply generally to the hyperboloidal acoustic transducer 200. The only significant difference is that both transducers employ a different type of doubly ruled radiation surface.

Like the previous embodiments, the hyperboloidal acoustic transducer 200 may comprise a plurality of straight elongate acoustically active transducer elements 202, such as piezoelectric line sources or the like. These transducer elements 202 may be formed from any suitable acoustic material and may take the forming of the elements shown in FIG. 2. A control system (not shown) may also be provided for operating the acoustic transducer 200 in active and passive modes to project and receive acoustic beams. In active mode, the control system is preferably configured to drive each transducer element 202 with a uniform phase. Like the first preferred embodiment, each transducer element 202 produces a beam and all beams are superimposed to produce the final far field acoustic beam. The beam-width of the final acoustic beam is related to the angle $\phi$, which is the angular fraction of the full surface.

Figure 7A:
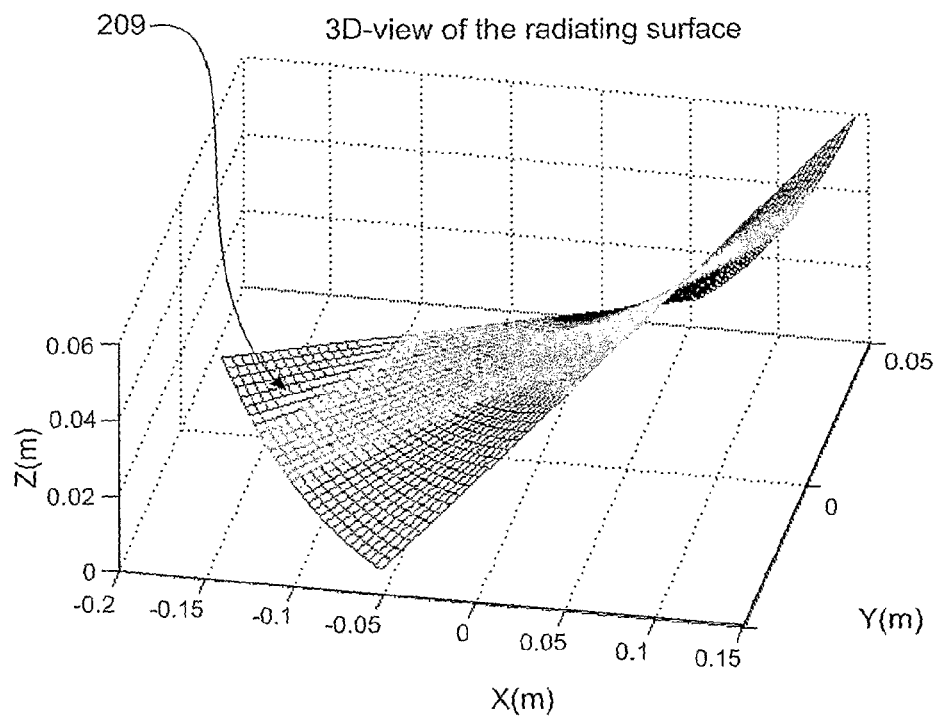
FIG. 7A is a three-dimensional view of the effective hyperboloidal radiation surface of the third preferred embodiment acoustic beam forming system of FIG. 6.

FIG. 7A shows a three-dimensional view of the effective hyperboloidal radiation surface 209 of the acoustic transducer 200 of FIG. 6. The dotted lines shown in FIG. 7A are grid lines and are not representative of any active or passive acoustic elements.

Figure 7B:
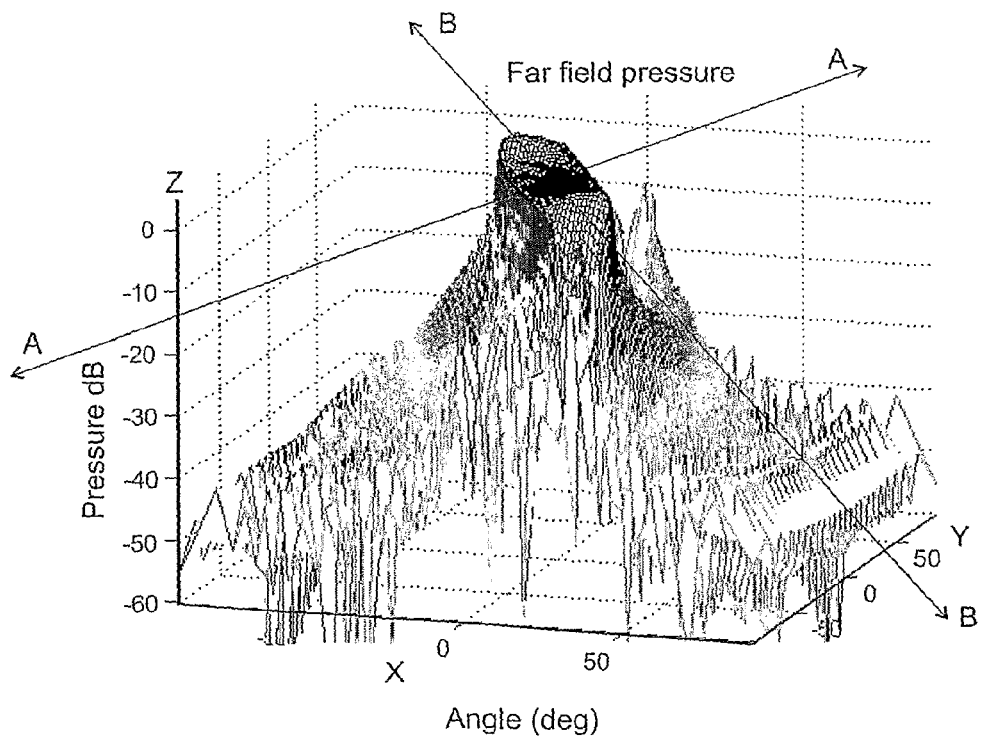
FIG. 7B is a three-dimensional view of a far-field beam pattern produced by the hyperboloidal radiation surface of FIG. 7A.
Figure 7C:
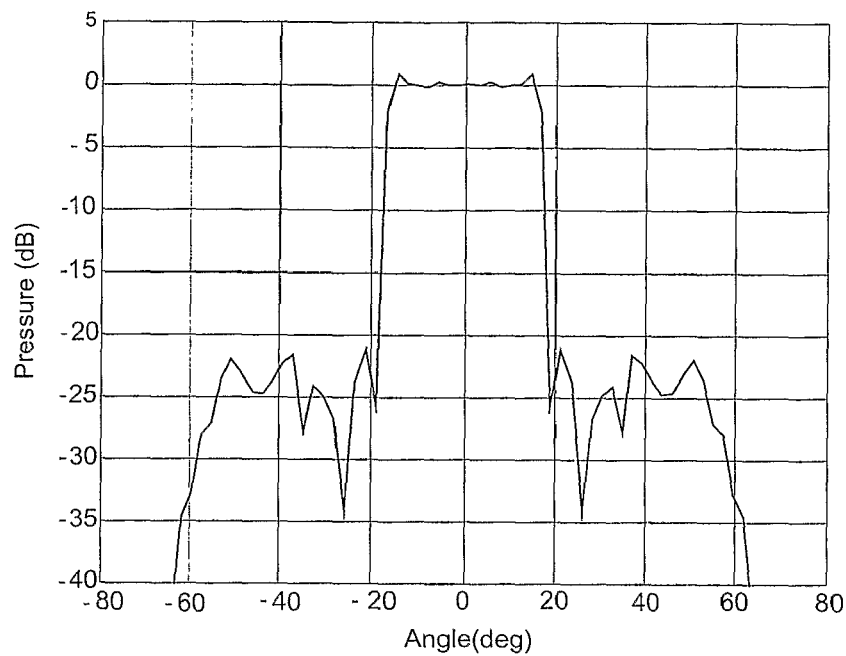
FIG. 7C is a cross-sectional view of the beam pattern of FIG. 7B along the line AA.
Figure 7D:
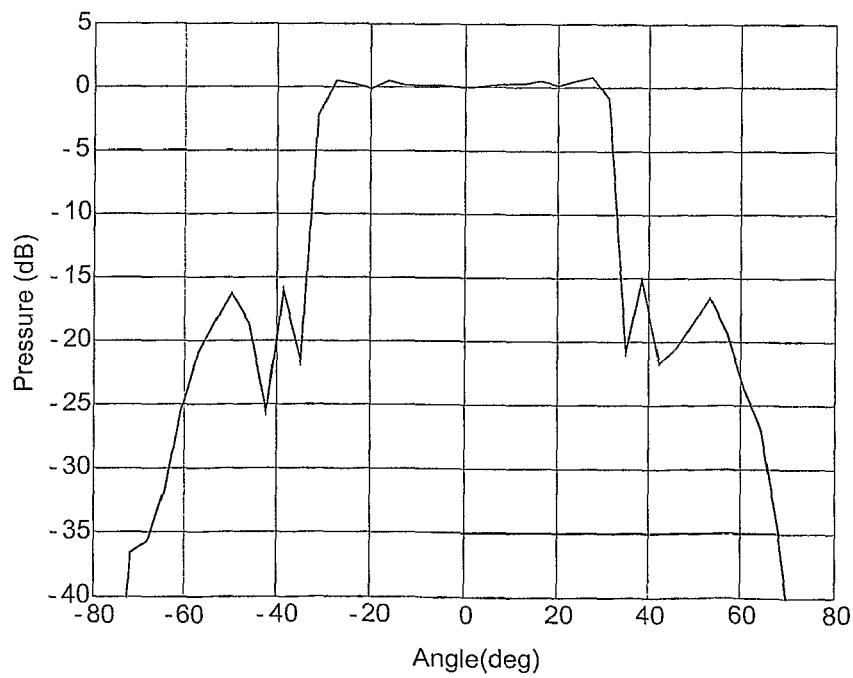
FIG. 7D is a cross-sectional view of the beam pattern of FIG. 7B along the line BB.

FIG. 7B shows a three-dimensional view of a far-field beam pattern formed by the acoustic transducer 200 having the hyperboloidal radiation surface 209 of FIG. 7A. FIGS. 7C and 7D show the cross-sectional views of the beam pattern of FIG. 7B in the vertical planes along lines AA and BB respectively. Comparing FIGS. 4B and 7B, the hyperbolic paraboloidal acoustic transducer 10 tends to have a more desirable far-field beam pattern compared to the hyperboloidal acoustic transducer 200 when projecting acoustic beams having wide angles in both the horizontal and vertical directions.

It will be appreciated that the hyperboloidal acoustic transducer 200 need not necessarily be formed from an array of straight elongate transducer elements 202, and could alternatively be formed from multiple differently shaped acoustic elements that act together as an elongate transducer element to provide an equivalent effect, or from a single continuous sheet or piece of acoustic material as with the first preferred embodiment. Likewise, the hyperboloidal beam forming system can employ active or passive acoustic transducer elements, and can be implemented in acoustic reflector or acoustic diffuser embodiments also. The hyperboloidal beam forming system can also be implemented in electromagnetic beam applications such as radar and the like as with the first embodiment.

By way of example, in other embodiments the hyperboloidal beam forming system comprises a surface of acoustically reflective material for an acoustic reflector. In this embodiment, the beam forming surface reflects an incident beam directed at the surface from a beam source. The beam forming surface may be formed from one sheet of material arranged as a hyperboloid of one sheet. It will be appreciated that other hyperboloidal embodiments of acoustic reflectors or diffusers can be constructed using acoustically active or passive materials with the specific acoustic impedance significantly different from the impedance of the acoustic medium.

Matrix Electrode System

With reference to the first preferred embodiment acoustic transducer 10 shown in FIGS. 1-3, the front 5 and back 4 electrodes of each transducer element 2 run along the front and rear faces of the acoustically active material, such as the piezoelectric ceramic plate 6. In the overall array of transducer elements 2, this results in rows of pairs of aligned front 5 and back 4 electrodes extending down the hyperbolic paraboloidal radiation surface. More particularly, the front and back electrodes are aligned to the same family of rulings of the doubly ruled surface. When the electrode pair 4,5 for each transducer element is driven by the control system, the individual beams all superimpose together to form the final wide-angle acoustic beam in the far field.

Figure 8:
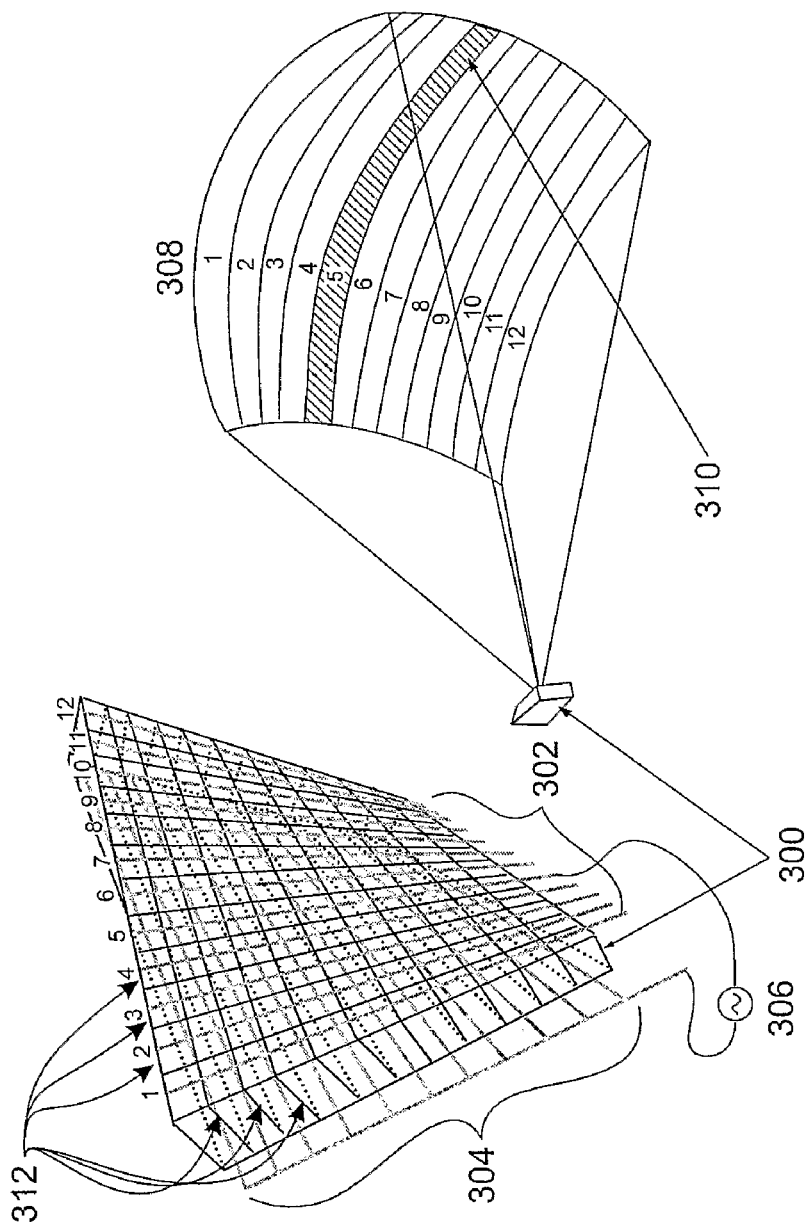
FIG. 8 is a schematic diagram of the fourth preferred embodiment acoustic beam forming system that is driven by a matrix electrode system that is configured to cause the acoustic beam forming system to project a beam-stripe within the overall beam field.
Figure 9:
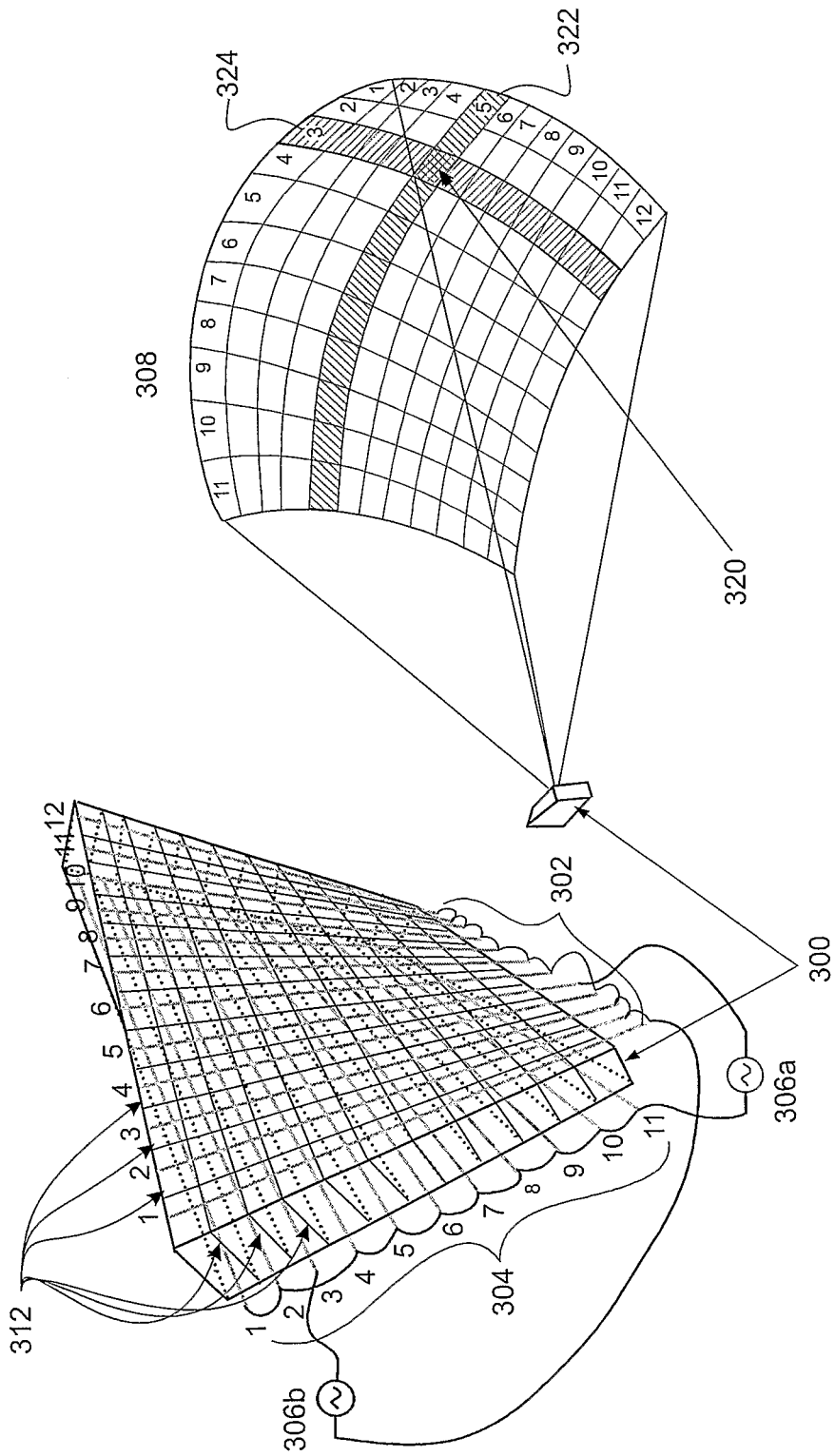
FIG. 9 is a schematic diagram of the matrix electrode system of FIG. 8 being configured to cause the acoustic beam forming system to project a beam-spot within the overall beam field.

With reference to FIGS. 8 and 9, in an alternative embodiment, either of the doubly ruled radiation surface embodiments of the beam forming system may comprise a matrix electrode system in which the front electrodes run vertically in columns on the front side of the acoustically active material and the back electrodes run horizontally in rows on the rear side of the acoustically active material, or vice versa. The control system that is electrically connected to each of the front and back electrodes can drive all electrodes to produce the far-field wide-angle beams in both the horizontal and vertical directions as before, or alternatively can drive selected combinations of rows and columns of electrodes to generate beam-stripes or beam-spots within the field of view.

Referring to FIG. 8, a hyperbolic paraboloidal acoustic transducer 300 is shown. The acoustic transducer comprises a hyperbolic paraboloidal array of individual acoustic block elements 312 of active beam forming material, such as piezoelectric material or the like. In this embodiment, the individual acoustic block elements 312 are preferably acoustically insulated from each other. By way of example, there may be a matrix array of N×M acoustic block elements 312, ie an array comprising N rows and M columns. The matrix electrode system comprises a front series of front electrodes 302 that run in columns (numbered 1-12 for example) vertically across the front face of the acoustic elements 312 and a back series of electrodes 304 that run in rows horizontally across the rear face of the acoustic elements. More particularly, the front and back electrodes run along alternate families of rulings of the doubly ruled radiation surface. This creates a matrix-type network of electrodes in which the front series of electrodes run along one family of rulings and the back series of electrodes run along the other family of rulings. It will be appreciated that the number of acoustic block elements, and the number of front and back electrodes in each series, may be varied as desired to suit different applications and requirements.

When all front 302 and back 304 electrodes are driven by the control system, the acoustic transducer 300 operates to produce a wide-angle acoustic beam with sharp angular cut-offs as before, with the horizontal and vertical beam-width angles being defined by the angular parameters of the hyperbolic paraboloidal radiation surface. However, with the matrix electrode system, additional functionality is provided for the acoustic transducer 300 in its projection capabilities. For example, the control system, such as a waveform generator 306, may be arranged to drive all the rows of horizontal back electrodes 304 but only the 5th column of the vertical front electrodes 302. The result of this is that the acoustic transducer 300 will project a horizontal wide-angle beam-stripe (or swath beam) 310 in the far-field view 308. Therefore, if there are N back electrodes and M front electrodes, the matrix electrode system can be configured or driven by the control system to generate N swath beams parallel to one family of rulings and M swath beams parallel to the other family of rulings, each swath beam corresponding to a column or row of acoustic elements 312 activated or driven by the control system.

Referring to FIG. 9, the matrix electrode system also allows the generation of N×M spot-beams directed to a particular spot in the far-field view 308 corresponding to the crossing point of the columns and rows of acoustic elements 312 activated, ie by addressing a crossed-array of acoustic elements. The columns of front electrodes 302 are again numbered 1-12, and the rows of back electrodes 304 are numbered 1-11. By way of example, FIG. 9 shows a control system comprising a first waveform generator 306a that is arranged to drive the $5^{th}$ column to generate a horizontal swath beam 322 and a second waveform generator 306b that is arranged to drive the $3^{rd}$ row to generate a vertical swath beam 324 in the far-field view 308. The intersection of the vertical and horizontal swath beams (or beam-stripes) 322, 324 creates the projection of a beam-spot 320 in the far-field view 308.

The foregoing describes the invention including preferred forms thereof. Modifications may be made thereto without departing from the scope of the invention as defined by the accompanying claims.

The invention claimed is:

1. A beam forming system comprising one or more beam forming elements that are arranged to provide a non-planar doubly ruled radiation surface, the surface being defined by two families of rulings and wherein the length of the rulings within each family are configured to provide a radiation surface with substantially straight boundary edges, and wherein the beam forming system is arranged to form acoustic beams.

2. A beam forming system according to claim 1 wherein the radiation surface is a hyperbolic paraboloid.

3. A beam forming system according to claim 1 wherein the radiation surface is a hyperboloid of one sheet.

4. A beam forming system according to claim 1 wherein the beam forming elements comprise an array of straight elongate beam forming elements that are arranged relative to each other to collectively provide the non-planar doubly ruled radiation surface.

5. A beam forming system according to claim 4 wherein each straight elongate beam forming element comprises a plurality of beam forming elements that act together to from the straight elongate beam forming element.

6. A beam forming system according to claim 4 wherein the straight elongate beam forming elements are fixed relative to each other within a support structure so as to provide a predetermined beam-width of beams propagating from the radiation surface.

7. A beam forming system according to claim 4 wherein the straight elongate beam forming elements are movably supported relative to each other within a frame system, the frame system being operable to rotate the straight elongate beam forming elements relative to each other to alter angular parameters of the non-planar doubly ruled radiation surface so as to vary the beam-width of beams propagating from the radiation surface.

8. A beam forming system according to claim 1 in which a single beam forming element provides the non-planar doubly ruled radiation surface.

9. A beam forming system according to claim 8 wherein the single beam forming element comprises a continuous sheet of beam forming material that conforms to a non-planar doubly ruled surface.

10. A method of producing an acoustic beam comprising driving a beam forming system of claim 1 with a uniform phase.

11. A beam forming system according to claim 1 that is arranged as an acoustic transducer for projecting and/or receiving acoustic beams from or at the radiation surface.

12. A beam forming system according to claim 11 wherein the or each beam forming element is an acoustic transducer element comprising an active acoustic material that is operatively driven by front and back electrodes provided on opposing surfaces of the active acoustic material.

13. A beam forming system according to claim 12 further comprising a control system that is operatively connected to the electrodes and is arranged to drive the electrodes with electrical signals to cause the acoustic transducer to project and/or receive acoustic beams.

14. A beam forming system according to claim 13 wherein the control system is configured in an active mode to drive the acoustic transducer element(s) with electrical signals having uniform phase to produce an acoustic beam from each acoustic transducer element such that the overall acoustic beam projected from the radiation surface is the superposition of all of the acoustic beams from each acoustic transducer element.

15. A beam forming system according to claim 12 wherein the front and back electrodes are aligned with one family of rulings of the doubly ruled radiation surface.

16. A beam forming system according to claim 12 wherein the front electrodes of the acoustic transducer element(s) are aligned with one family of rulings of the doubly ruled radiation surface and the back electrodes are aligned with the other family of rulings of the doubly ruled radiation surface to provide a matrix electrode network.

17. A beam forming system according to claim 16 wherein a control system is operatively connected to all the electrodes in the matrix electrode network, and is operable to selectively drive different combinations of electrodes with electrical signals to thereby drive different combinations of selected acoustic transducer elements to produce any of the following: a wide-angle acoustic beam, acoustic beam-stripe, or an acoustic spot-beam.

18. A beam forming system according to claim 1 wherein each beam forming element comprises passive acoustic material such that the beam forming system can operate as an acoustic reflector or acoustic diffuser of acoustic beams incident on its radiation surface.

19. A beam forming system according to claim 18 wherein the passive acoustic material of the beam forming element(s) is acoustically reflective.

20. A beam forming system according to claim 1 wherein the system is an active beam forming device.

21. A beam forming system according to claim 1 wherein the system is an active acoustic device comprising beam forming element(s) comprising acoustically active material.

22. A beam forming system according to claim 1 wherein the system is an acoustic reflector comprising beam forming element(s) that are straight elongate active or passive acoustic elements of reflective material.

23. A beam forming system according to claim 1 wherein the system is an acoustic diffuser comprising beam forming element(s) that are straight elongate active or passive acoustic elements of reflective material.

24. A beam forming system comprising one or more beam forming elements that are arranged to provide a non-planar doubly ruled radiation surface, wherein the beam forming system is arranged to form acoustic beams.

\* \* \* \* \*